(12) United States Patent
Piel et al.

(10) Patent No.: US 10,152,431 B2
(45) Date of Patent: Dec. 11, 2018

(54) SYSTEM AND METHOD FOR REMOTE SET-UP AND ADJUSTMENT OF PERIPHERALS

(71) Applicant: Honeywell International Inc., Morristown, NJ (US)

(72) Inventors: Kevin G. Piel, Ronkonkoma, NY (US); Kenneth G. Eskildsen, Great Neck, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 128 days.

(21) Appl. No.: 14/658,342

(22) Filed: Mar. 16, 2015

(65) Prior Publication Data
US 2016/0275022 A1 Sep. 22, 2016

(51) Int. Cl.
G06F 13/00 (2006.01)
G06F 13/10 (2006.01)
H04L 12/28 (2006.01)
G06F 3/00 (2006.01)

(52) U.S. Cl.
CPC ........ G06F 13/102 (2013.01); H04L 12/2816 (2013.01)

(58) Field of Classification Search
CPC ........... G06F 13/00; G06F 3/00; G06F 13/102
USPC ................................................ 710/8, 10, 14
See application file for complete search history.

(56) References Cited

U.S. PATENT DOCUMENTS

| 9,640,005 B2* | 5/2017 | Geerlings | G08C 17/02 |
| 2006/0125621 A1* | 6/2006 | Babich | G08B 29/14 340/514 |
| 2008/0151795 A1* | 6/2008 | Shorty | H04L 12/2838 370/310 |
| 2014/0266669 A1* | 9/2014 | Fadell | G05B 19/042 340/501 |
| 2016/0275022 A1* | 9/2016 | Piel | G06F 13/102 |

OTHER PUBLICATIONS

The extended European search report from corresponding EP patent application 16158849.6, dated Jun. 20, 2016.

* cited by examiner

*Primary Examiner* — Christopher B Shin
(74) *Attorney, Agent, or Firm* — Husch Blackwell LLP

(57) ABSTRACT

A system and process of adjusting units coupled to a control element which includes, installing the unit at a selected location. A parameter can be entered from a displaced user operable device. The unit can be directed to carry out a selected function. Performance can be evaluated whether an additional parameter alteration is required based on a predetermined criterion.

5 Claims, 2 Drawing Sheets

SYSTEM AND METHOD FOR REMOTE SET-UP AND ADJUSTMENT OF PERIPHERALS

FIELD

The application pertains to systems and methods of adjusting devices being installed in a computer based communications system. More particularly, the application pertains to such systems and methods which enable an installer to specify, or alter, parameter values of units from a distance.

BACKGROUND

During installation of monitoring, or security, systems various peripherals such as detectors, or input/output devices can sometimes require multiple setting adjustments in order to perform their respective functions properly. This can add time and steps to every installation by causing the installer to have to climb a ladder, open the device, make adjustments, close the unit and then re-test the settings (in some cases multiple times).

DETAILED DESCRIPTION

Figure 1:
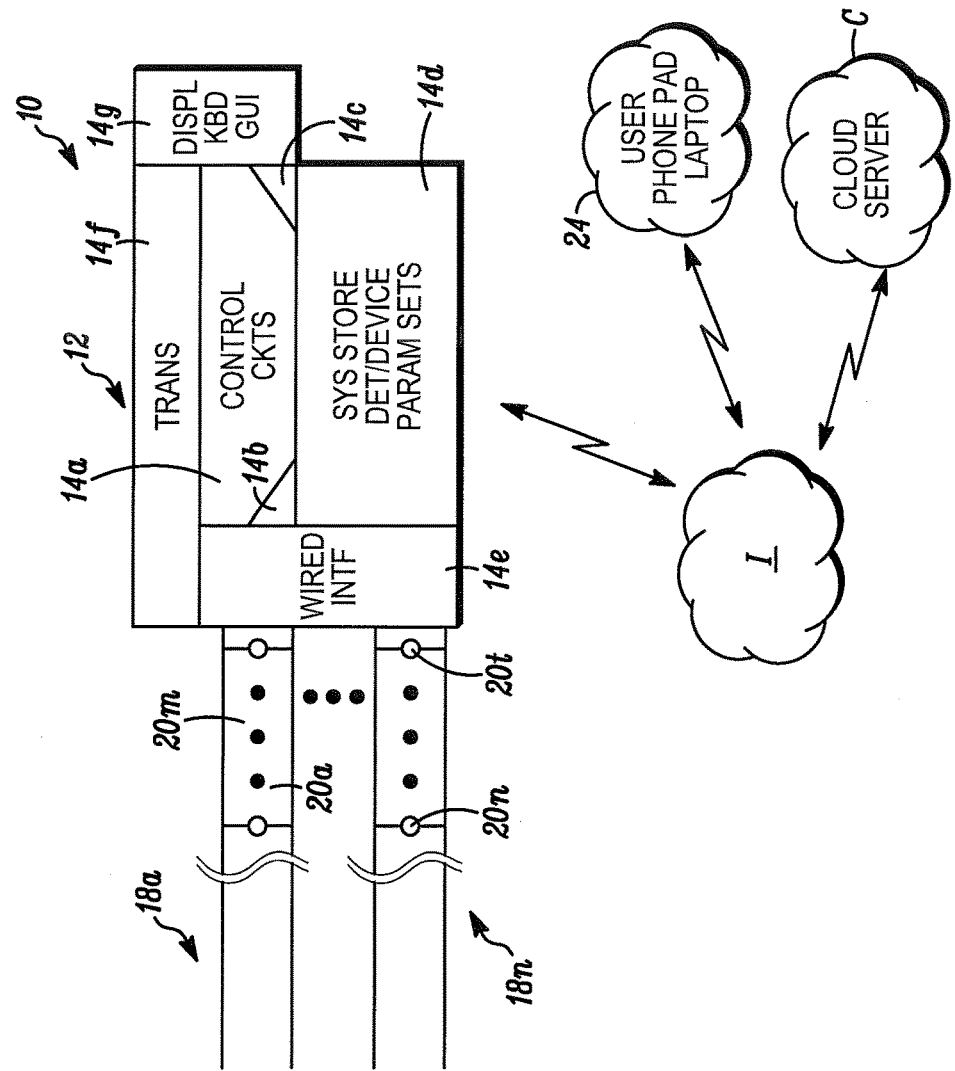
FIG. 1 illustrates a block diagram of a system in accordance herewith.
Figure 1:
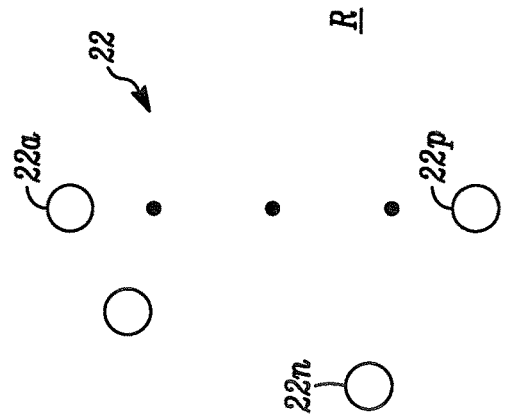

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect the settings of devices or units can be adjusted via a local user interface, such as a system keypad, or remotely via a smartphone app or via a computer network, such as ValueNet or other networks. As a result, the effort in carrying out multiple adjustment steps can minimized thereby saving installation, or, maintenance time and ultimately reducing customer expenses.

In another aspect, a method in accordance herewith can include setting up a control element. A device or unit to be installed is "paired" with the control element. It can then be physically installed as required. The device can then be tested using its default parameter settings.

If the settings need to be adjusted, the installer can do so from a remote controller. For example, the control element might include a keypad, or graphical user interface. Alternately, a smartphone, or other type of communications device can be used to adjust the settings via a computer network, such as the Internet. The device can be tested again without requiring the installer to physically contact the device, a second time, after installation, to adjust the settings.

Where a displaced communications device is being used to adjust the settings, the device can illuminate an indicator confirming that its settings are being revised, or changed. Alternately, an audible output can be emitted by the device.

If desired, remote settings can be stored with a cloud service. They can be synced with the unit or device via a GSM/CDMA cellular-type radio or via a computer network, such as the Internet, either in a hardwired, or wireless implementation. Such communications can also be encrypted for security.

FIG. 1 illustrates an embodiment hereof, a system 10 which provides a monitoring function for a region R. Other than as discussed herein, the exact type of monitoring that is being carried out relative to the region R is not a limitation hereof.

System 10 includes a control element, or control panel, 12. Control element 12 includes control circuits 14a, which might be implemented, at least in part with one or more programmable processors 14b along with executable control circuitry 14c.

A system storage unit 14d, used to store detector, or device parameter sets, 14d is coupled to and readable by the control circuits 14a. Element 12 can also include zone input/output interfaces 14e for communicating with one or more hardwired loops 18a, 18b . . . 18n. Element 12 can also include one or more transceivers 14f for communicating with wireless devices, or computer networks, such as internet I as discussed below.

Pluralities of detectors or other units 20a . . . 20n can be coupled to loops 18a . . . 18n as would be understood by those of skill in the art. Members of the pluralities 20a . . . 20n can include without limitation ambient condition security detectors such as glass break detectors, intrusion detectors, position detectors all without limitation. Such pluralities can also include smoke, fire, gas, thermal or other ambient condition detectors without limitation.

A plurality of wireless detectors, indicator units or actuators 22 can be in wireless communication with the transceiver 14f. It will be understood that the units 20 and units 22 either are or would be installed throughout the region R to provide monitoring, warning or control functions.

The control element 12 can also include a user interface 14g. Interface 14g can be in hardwired or wireless communication with control element 12. It can be implemented with a displaced, keyboard or graphical user interface without limitation.

System 10 can be internet enabled and can communicate via network I with a displaced cloud server C along with a user device 24, such as a cellular-type phone, pad or laptop.

Figure 2:
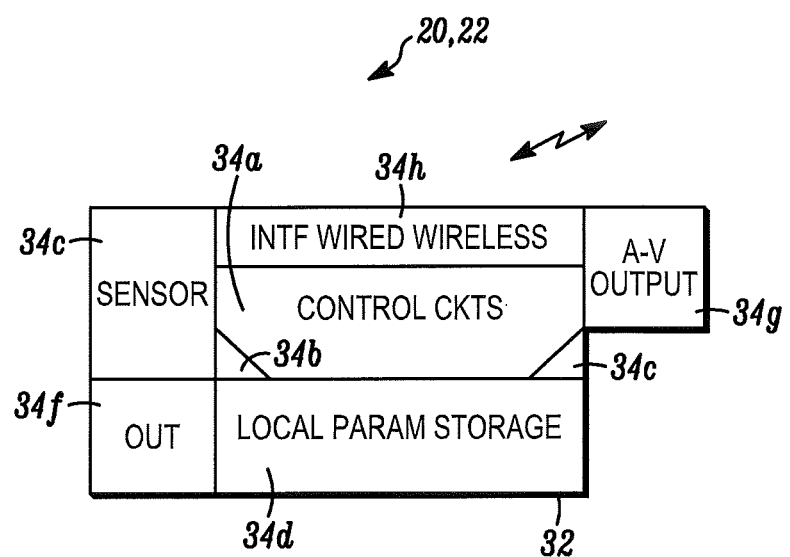
FIG. 2 is a block diagram of a device usable with the system of FIG. 1.

FIG. 2 a block diagram of members of the pluralities 20, 22, includes a housing 32. Housing 32 can carry control circuits 34a implemented at least in part by one or more programmable processors 34b along with executable control software 34c. Parameters values for the unit of FIG. 2 can be stored in local parameter storage unit 34d, a read-write storage unit. Members of the pluralities 20, 22 can include some or all of local condition sensors 34e as well as output circuitry 34f.

Audio or visual output devices can also be carried by housing 32 and coupled to control circuits 34a.

In summary, where members of the pluralities 20, 22 are to be installed or adjusted, such activities can be facilitated as described herein. For example, the respective unit can be initially installed with default parameter settings or parameter values in the storage unit 34d of each. Performance of the unit can be evaluated by sending test commands to the element 12 which can in turn communicate with the detectors or units 20i, or 22j.

If performance of the respective detectors or units such as 20i, or 22j needs to be adjusted, the installer can do so from a remote control element, such as element 12. For example, as noted above the control element 12 might include one or more of a keypad, or graphical user interface 14g. Alternately, a smartphone, or other type of communications device 24 can be used to adjust the settings via a computer network, such as the Internet I. It will be understood that the units 20, 22 can be adjusted via local control circuitry, or can be adjusted via software that implements processes and/or adjusts thresholds. The device can be tested again without requiring the installer to physically contact the device, a second time, after installation, to adjust the parameter values, or, settings of the respective unit.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
    a control panel that includes a storage unit that stores unit parameter sets;
    a portable user device in wireless communication with the control panel; and
    a first unit in wired or wireless communication with the control panel and paired with the control panel,
    wherein first unit includes local control circuitry that implements a selected adjustable setting that, when adjusted, alters a performance of the first unit,
    wherein the portable user device sends test commands to the control panel,
    wherein, responsive to receiving the test commands, the control panel identifies a selected first value from the unit parameter sets in the storage unit and directs the first unit to carry out a selected function using the selected first value for the selected adjustable setting,
    wherein, responsive to first results of the first unit carrying out the selected function, the portable user device transmits a selected instruction to the control panel, and
    wherein, responsive to receiving the selected instruction, the control panel identifies a selected second value from the unit parameter sets in the storage unit and directs the first unit to adjust the selected adjustable setting to the selected second value when carrying out the selected function.

2. The system as in claim 1 wherein the portable user device includes at least one of a keypad, an audible input device, a graphical user interface, a cellular-type user communications device, or an internet enabled user communications device.

3. The system as in claim 1 wherein the first unit is paired with the control panel before the control panel directs the first unit to carry out the function.

4. The system as in claim 1 wherein the first unit includes an indicator that outputs a signal indicative of adjusting the adjustable setting of the first unit.

5. The system as in claim 1 further comprising:
    a plurality of units in wired or wireless communication with the control panel and paired with the control panel,
    wherein, responsive to receiving the test commands, the control panel directs a respective one of the plurality of units to carry out a respective function using a respective first value for a respective adjustable setting,
    wherein, responsive to respective results of the respective one of the plurality of units carrying out the respective function, the portable user device transmits a respective instruction to the control panel, and
    wherein, responsive to receiving the respective instruction, the control panel directs the respective one of the plurality of units to adjust the respective adjustable setting to a respective second value when carrying out the respective function.

* * * * *